(12) United States Patent
Choi

(10) Patent No.: US 10,787,163 B2
(45) Date of Patent: Sep. 29, 2020

(54) METHOD OF CONTROLLING ENERGY REGENERATION FOR MILD HYBRID VEHICLE

(71) Applicants: Hyundai Motor Company, Seoul (KR); Kia Motors Corporation, Seoul (KR)

(72) Inventor: Kwang-Seok Choi, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 302 days.

(21) Appl. No.: 15/806,173

(22) Filed: Nov. 7, 2017

(65) Prior Publication Data

US 2018/0162361 A1    Jun. 14, 2018

(30) Foreign Application Priority Data

Dec. 14, 2016   (KR) .................. 10-2016-0170723

(51) Int. Cl.
B60W 20/14    (2016.01)
B60K 6/26     (2007.10)
(Continued)

(52) U.S. Cl.
CPC .............. B60W 20/14 (2016.01); B60K 6/26 (2013.01); B60K 6/48 (2013.01); B60K 6/485 (2013.01);
(Continued)

(58) Field of Classification Search
CPC ................. B60W 10/08; B60W 20/14; B60W 30/18127; B60W 10/18; B60W 20/12;
B60W 2710/18; B60W 10/26; B60W 20/00; B60W 20/15; B60W 2530/14;
B60W 2540/30; B60W 2550/142; B60W 2550/20; B60W 2550/402; B60W 2710/00; B60W 2710/248; B60W 50/0097; B60Y 2200/92;
(Continued)

(56) References Cited

U.S. PATENT DOCUMENTS 6,222,334 B1 *    4/2001  Tamagawa ............... B60L 7/10
                                                 180/65.21
2012/0029766 A1 *  2/2012  Niwa ...................... B60L 7/18
                                                   701/36
(Continued)

FOREIGN PATENT DOCUMENTS

KR        10-1583971 B1    1/2016

*Primary Examiner* — Tuan C To
*Assistant Examiner* — Paul A Castro
(74) *Attorney, Agent, or Firm* — Morgan, Lewis & Bockius LLP

(57) ABSTRACT

A method of controlling energy regeneration for a mild hybrid vehicle, the mild hybrid vehicle including a mild hybrid starter generator (MHSG) that includes a rotor having a permanent magnet and an electromagnet, and engine that is connected to the MHSG for power transmission, may include determining whether a difference between an excitation current required to drive the MHSG and a desired amount of generated current is less than a predetermined reference value; and prohibiting regenerative braking when a difference between the excitation current required to drive the MHSG and the desired amount of generated current is less than the predetermined reference value.

4 Claims, 2 Drawing Sheets

(51) Int. Cl.
*B60W 10/18* (2012.01)
*B60W 10/06* (2006.01)
*B60W 10/08* (2006.01)
*B60K 6/485* (2007.10)
*B60K 6/48* (2007.10)
*B60W 50/00* (2006.01)
*B60W 20/12* (2016.01)
*B60W 40/09* (2012.01)

(52) U.S. Cl.
CPC ............ *B60W 10/06* (2013.01); *B60W 10/08* (2013.01); *B60W 10/18* (2013.01); *B60W 20/12* (2016.01); *B60W 50/0097* (2013.01); *B60K 2006/268* (2013.01); *B60W 40/09* (2013.01); *B60W 2510/182* (2013.01); *B60W 2510/244* (2013.01); *B60W 2530/14* (2013.01); *B60W 2540/30* (2013.01); *B60W 2552/15* (2020.02); *B60W 2554/00* (2020.02); *B60W 2710/00* (2013.01); *B60W 2710/083* (2013.01); *B60Y 2200/92* (2013.01); *B60Y 2300/18125* (2013.01); *B60Y 2300/91* (2013.01); *B60Y 2400/47* (2013.01); *Y02T 10/6221* (2013.01); *Y02T 10/6226* (2013.01); *Y02T 10/6291* (2013.01); *Y10S 903/906* (2013.01)

(58) Field of Classification Search
CPC ...... B60Y 2200/91; B60Y 2300/18125; B60Y 2400/47; B60Y 2400/81; B60L 7/18; B60L 15/2009; B60L 2240/642; B60L 2240/62; B60L 2260/50; B60L 53/00; B60L 58/13; B60L 7/10; B60T 2270/60; B60T 13/586; B60T 2270/604; B60T 8/172; Y02T 10/645; Y02T 10/7275; Y02T 10/7291; Y02T 90/16; Y02T 10/6291; Y02T 10/7258; Y02T 90/162; F02N 11/04

See application file for complete search history.

(56) References Cited

U.S. PATENT DOCUMENTS

| | | | |
|---|---|---|---|
| 2015/0149008 A1* | 5/2015 | Jang | B60W 20/30 701/22 |
| 2015/0224845 A1* | 8/2015 | Anderson | B60G 17/052 701/37 |
| 2018/0257491 A1* | 9/2018 | Tomita | B60L 7/18 |

* cited by examiner

METHOD OF CONTROLLING ENERGY REGENERATION FOR MILD HYBRID VEHICLE

CROSS-REFERENCE(S) TO RELATED APPLICATIONS

The present application claims priority to Korean Patent Application No. 10-2016-0170723, filed on Dec. 14, 2016, the entire contents of which is incorporated herein for all purposes by this reference.

BACKGROUND OF THE INVENTION

Field of the Invention

The present invention relates to a method of controlling energy regeneration for a mild hybrid vehicle; and, particularly, to a method of controlling energy regeneration for a mild hybrid vehicle, which determines whether to perform regeneration control considering a relationship between an excitation current of a mild hybrid starter generator (MHSG) and a desired amount of charge.

Description of Related Art

In recent years, hybrid vehicles have been actively researched and developed to improve fuel efficiency and protect environments. Hybrid vehicles are largely classified into a mild hybrid vehicle and a full hybrid electric vehicle according to the charging method thereof.

The full hybrid electric vehicle may be driven only by a motor using charged power while the motor assists driving force.

On the other hand, a mild hybrid system is a system that is not provided with a traveling mode, in which a vehicle is driven only by a drive motor, but provides the torque required for traveling using a hybrid starter generator (HSG) which has a faster response speed than an engine to obtain a momentary high torque when the vehicle accelerates in a stopped state, or when the vehicle accelerates for overtaking while traveling.

Meanwhile, the typical full hybrid electric vehicle includes an HSG having a motor, and the motor has a permanent magnetic rotor. On the other hand, the mild hybrid system includes an MHSG having a motor, and the motor has a rotor that includes a permanent magnet, an excitation coil, and an electromagnet, wherein the rotor is configured to wind the excitation coil around the shaft of the rotor in a ring form, and then to surround the excitation coil by engaging claw poles at both ends thereof. Therefore, torque assistance and power generation may be performed only when a separate excitation current flows to the MHSG to magnetize the rotor, driving the MHSG.

Accordingly, when a vehicle ECU or HCU doesn't take into account the excitation current that must be supplied to the motor configured for torque assistance or determination of power generation torque, but takes into account only a state of charge (SOC) of a battery, the system may have low efficiency. When the MHSG is driven, the excitation current is constantly consumed regardless of an amount of generated charge and an amount of torque assistance. Hence, when the excitation current is not considered, the SOC may be lowered when a small amount of current is generated.

The information disclosed in the present Background of the Invention section is only for enhancement of understanding of the general background of the invention and should not be taken as an acknowledgement or any form of suggestion that the present information forms the prior art already known to a person skilled in the art.

BRIEF SUMMARY

Various embodiments of the present invention are directed to providing a method of controlling energy regeneration for a mild hybrid vehicle, configured for efficiently performing energy regeneration control by determining whether to perform a regeneration control mode considering an amount of excitation current of an MHSG.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method of controlling energy regeneration for a mild hybrid vehicle, the mild hybrid vehicle including an MHSG that includes a rotor having a permanent magnet and an electromagnet, and engine that is connected to the MHSG for power transmission, includes determining whether a difference between an excitation current required to drive the MHSG and a desired amount of generated current is less than a predetermined reference value, and prohibiting regenerative braking when the difference between the excitation current required to drive the MHSG and the desired amount of generated current is less than the predetermined reference value.

The desired amount of generated current may be an estimated amount of generated current that is determined through vehicle traveling information.

The estimated amount of generated current may be determined by estimating a cumulative braking time based on navigation information and a brake pressure signal, and estimating an amount of generated current based on the estimated cumulative braking time and an SOC of a vehicle battery.

The navigation information may include at least one of path information, traffic situation information, and path gradient information.

The vehicle traveling information may include a driver's driving characteristic information that is previously learned and stored in connection with a brake operation.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of

DETAILED DESCRIPTION

Reference will now be made in detail to various embodiments of the present invention(s), examples of which are illustrated in the accompanying drawings and described. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a system and method of controlling energy regeneration for a mild hybrid vehicle according to exemplary embodiments of the present invention will be described in detail with reference to the accompanying drawings.

Figure 1:
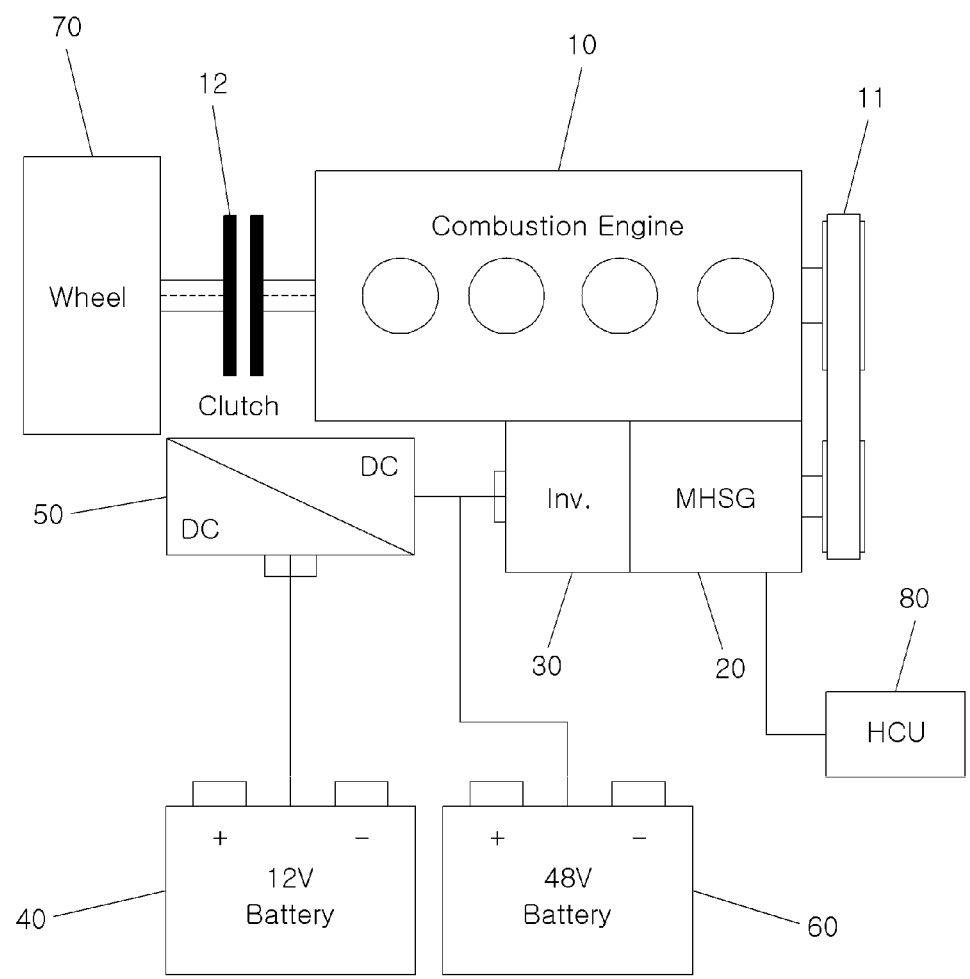
FIG. 1 is a diagram schematically illustrating a mild hybrid system using a method of controlling energy regeneration for a mild hybrid vehicle according to an exemplary embodiment of the present invention.

FIG. 1 is a diagram schematically illustrating a mild hybrid system using a method of controlling energy regeneration for a mild hybrid vehicle according to an exemplary embodiment of the present invention.

As illustrated in FIG. 1, a charging apparatus for a mild hybrid electric vehicle, using the method of controlling energy regeneration for a mild hybrid vehicle according to the exemplary embodiment of the present invention, includes an engine 10, a mild hybrid starter generator (MHSG) 20 that generates AC power by driving the engine 10 or through regenerative braking, an inverter 30 that converts the AC power generated by the MHSG 20 into DC power to supply the DC power to a battery or converts the DC power of the battery into AC power to supply the AC power to the MHSG 20, a high-voltage 48V battery 60 that is charged with the DC power supplied from the inverter 30 or supplies the DC power thereof to the inverter 30, a DC-DC converter 50 that manages a battery voltage and performs a voltage boost function, and a low-voltage 12V battery 40 that is charged with the DC power supplied from the DC-DC converter 50.

A crankshaft pulley of the engine 10 is connected to a motor output shaft pulley of the MHSG 20 by an MHSG drive belt 11. Accordingly, when the engine 10 is started, it is started by the driving force transmitted from the MHSG 20. On the other hand, after the engine 10 is started, the engine 10 is configured to supply power to the MHSG 20. In addition, an engine clutch 12 is provided between the engine 10 and a wheel 70 to switch the power transmission.

When the engine 10 is started, the MHSG 20 is configured as a starter that starts the engine by the power supplied from the high-voltage 48V battery 60 through the inverter 30. After the engine 10 is started, the MHSG 20 converts the rotational kinetic energy of the wheel 70 into electrical energy to generate AC power when the vehicle decelerates, and the MHSG 20 assists the torque of the engine 10 using the driving force of the motor while the vehicle travels.

Meanwhile, the MHSG 20 includes a motor having a rotor that includes a permanent magnet and an electromagnet, unlike the motor of the HSG included in a full hybrid electric vehicle. Therefore, the operation of torque assistance and power generation may be performed only when a separate excitation current flows to the MHSG 20 to magnetize the rotor to drive the MHSG 20.

The inverter 30 converts the DC power of the high-voltage 48V battery 60 into AC power to supply the DC power to the MHSG 20, or converts the AC power generated by the MHSG 20 into DC power to supply the DC power to the high-voltage 48V battery 60 or the DC-DC converter 50.

The high-voltage 48V battery 60 supplies DC power to the inverter 30 when the engine 10 starts or at the time of engine torque assistance during traveling of the vehicle to enable the MHSG 20 to transmit the driving force to the engine 10. Meanwhile, the high-voltage 48V battery 60 is charged when the AC power generated during regenerative braking is converted into DC power by the inverter 30. In addition, the high-voltage 48V battery 60 is configured to supply power to the low-voltage 12V battery 40 and/or an electrical system.

The DC-DC converter 50 is electrically connected to the inverter 30 and the high-voltage 48V battery 60. The DC-DC converter 50 drops a voltage of the DC power of the inverter 30 or the high-voltage 48V battery 60 to be within a charging voltage range of the low-voltage 12V battery 40, and supplies the voltage-dropped power to the low-voltage 12V battery 40.

An HCU 80 determines a desired amount of torque for engine torque assistance and regenerative braking according to the MHSG 20, and instructs and controls the MHSG 20 to output the desired amount of torque for the engine torque assistance and regenerative braking.

In addition, the HCU 80 is configured to determine whether to perform regenerative braking by comparing a desired amount of charging current with an amount of current loss due to magnetization of the MHSG 20. A desired amount of charge is determined based on the current amount of charge of the high-voltage 48V battery 60, and is compared with the amount of excitation current required to drive the MHSG 20. The regenerative braking is performed when the difference between the desired amount of charge and the amount of excitation current exceeds a predetermined reference value, and the regenerative braking is not performed when the difference is equal to or less than the reference value.

The HCU 80 estimates an amount of generated current as the desired amount of charge, based on the traveling information received from a driving assistance system including a navigation system, and compares the amount of generated current with the amount of current loss due to magnetization to determine whether to perform regenerative braking, as described above.

Figure 2:
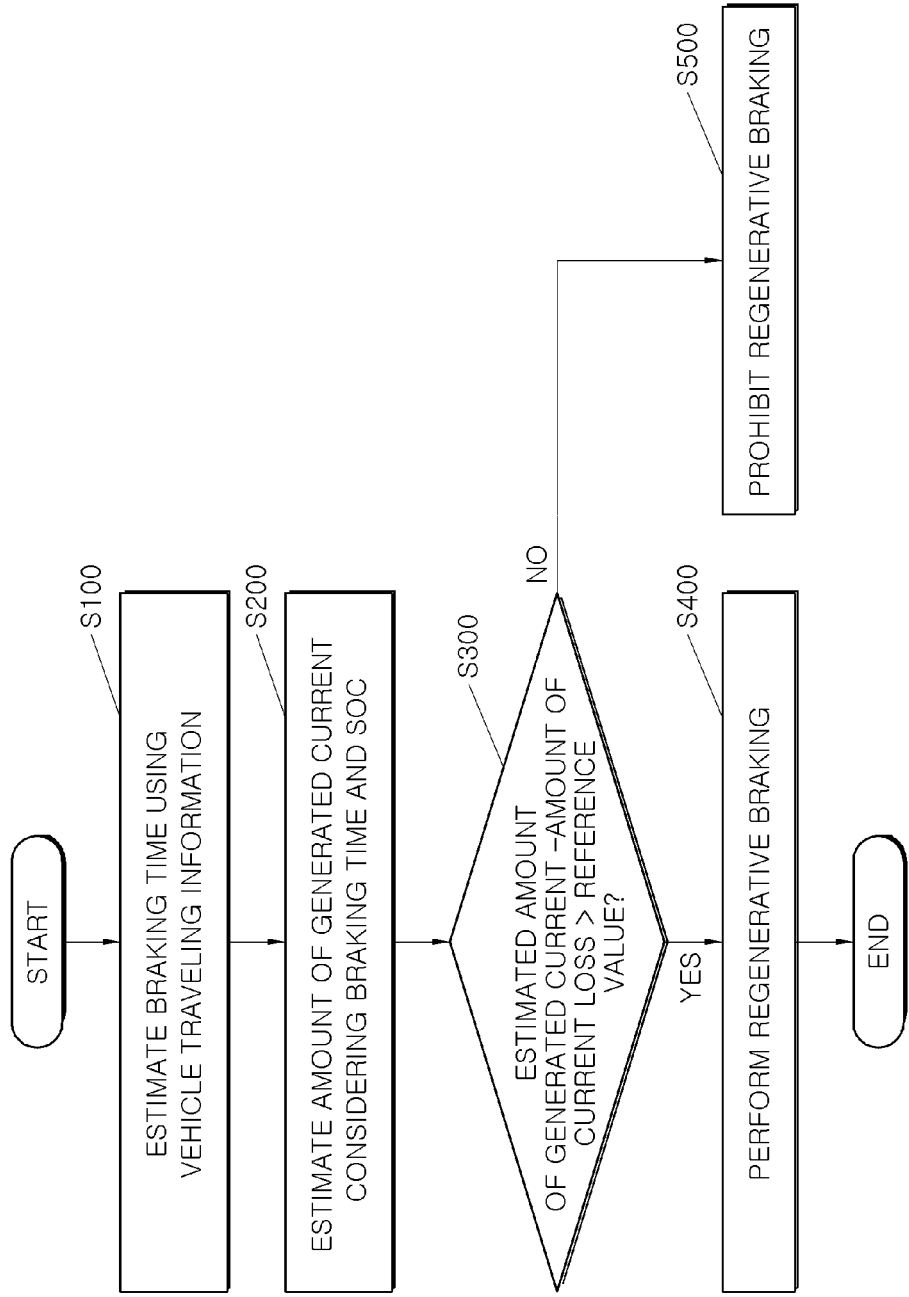
FIG. 2 is a flowchart illustrating the method of controlling energy regeneration for a mild hybrid vehicle according to the exemplary embodiment of the present invention.

FIG. 2 is a flowchart illustrating the method of controlling energy regeneration for a mild hybrid vehicle according to the exemplary embodiment of the present invention. As described above with reference to FIG. 1, the method of controlling energy regeneration for a mild hybrid vehicle according to the exemplary embodiment of the present invention sets a desired amount of charge based on the current amount of charge of the high-voltage 48V battery 60, and compares the desired amount of charge with the amount of excitation current required to drive the MHSG 20 to determine whether to perform regenerative braking according to whether the difference therebetween exceeds a predetermined reference value. In the exemplary embodiment of the present invention, the desired amount of charge may be replaced with an estimated amount of generated current that is estimated through traveling information, which will be described later with reference to FIG. 2.

As illustrated in FIG. 2, the HCU 80 estimates a cumulative braking time using vehicle traveling information (S100). To the present end, the HCU 80 determined an estimated braking time based on the data received from a driving assistance system including a navigation system.

In the present case, the traveling information includes at least one data of path information, traffic situation information, and path gradient information, which are transferred from the navigation. The number of times of estimated braking may vary depending on whether the estimated traveling path is a highway or a downtown street. In addition, the number of times of estimated braking may vary depending on the current traffic conditions in the estimated traveling path, i.e. the large or small volume of traffic. In addition, the number of times a driver brakes may vary depending on the difference in height (gradient) of the estimated traveling path. When a predetermined variable depending on the present individual traveling situation is stored and a traveling path is determined, the number of times of estimated braking and estimated braking time may be determined based on the data related to the traveling path, the brake pressure signal transferred from an actual APS detector, or the like.

The traveling information may include a driver's driving characteristic information that is previously learned and stored in connection with a brake operation. A variety of driving habits may be present depending on the driver, and the number of times of braking in the same path may vary depending on the driver's driving habit. Accordingly, the control device, e.g., the HCU 80 may learn a driver's driving habit related to the brake operation for a certain time, and the result of learning may be used to estimate the number of times of braking and a braking time. The learning may be performed using the data transferred from the APS detector that is disposed in the vehicle, and is preferably performed separately by classifying the driver's driving habits according to the characteristic of a specific path. In the vehicle used by a plurality of drivers, each of the drivers be stored in advance and the learning be performed for each individual driver.

Next, an amount of generated current may be estimated from the number of times of estimated braking and estimated braking time and consideration of the current amount of charge of the high-voltage 48V battery 60 (S200). That is, it is possible to determine an amount of generated current, which is estimated when regenerative braking is performed on the estimated traveling path, from the current SOC of the high-voltage 48V battery 60 and the number of times of estimated braking and estimated braking time.

As described above with reference to FIG. 1, the HCU 80 sets a desired amount of charge based on the current amount of charge of the high-voltage 48V battery 60, and compares the desired amount of charge with the amount of excitation current required to drive the MHSG 20 to determine whether to perform regenerative braking according to whether the difference therebetween exceeds a predetermined reference value, in the exemplary embodiment of the present invention. Meanwhile, in the exemplary embodiment of FIG. 2, the desired amount of charge is replaced with the estimated amount of generated current that is determined in step S200. Thus, in the exemplary embodiment of FIG. 2, the estimated amount of generated current determined in step S200 is compared with the amount of excitation current required to drive the MHSG 20, and whether to perform regenerative braking is determined according to whether the difference therebetween exceeds the predetermined reference value (S300). Here, the reference value is a value that is predetermined considering efficient battery management and durability of a belt, a motor, and an inverter according to a frequent change in mode.

The estimated amount of generated current determined in step S200 is compared with the amount of excitation current that is required to drive the MHSG 20. In the present case, when the difference between the estimated amount of generated current and the amount of excitation current is equal to or less than the predetermined reference value, the regenerative braking is not performed (S500) since, when the regenerative braking is performed, the SOC of the battery may be lowered due to loss by the excitation current.

The estimated amount of generated current determined in step S200 is compared with the amount of excitation current that is required to drive the MHSG 20. In the present case, when the difference between the estimated amount of generated current and the amount of excitation current exceeds the predetermined reference value, the regenerative braking is performed (S400) since the SOC of the battery is configured to be stably managed even though the regenerative braking is performed while the vehicle traveling on the corresponding path.

According to the exemplary embodiment of the present invention, the amount of current generated by the MHSG 20 is estimated in advance while the vehicle travels on the estimated traveling path, and is compared with the amount of excitation current that is required to drive the MHSG 20. In the present case, the regenerative braking is performed only when the SOC of the battery is stably maintained. Through the present process, the SOC of the battery can be efficiently managed and the vehicle can have stable driving power performance and durability.

In accordance with exemplary embodiments of the present invention, it is possible to stably manage an SOC of a battery by removing inefficient factors and suppressing a frequent change in mode of an MHSG when managing the SOC of the battery.

In addition, it is possible to suppress a frequent change in mode of a machine in a constant SOC of the battery and to prevent durability of a belt, a motor, and an inverter from deteriorating due to the frequent change in mode. Accordingly, since the drive mode is maintained in a stable state, it is possible to stably realize power performance.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling energy regeneration for a hybrid vehicle, the hybrid vehicle including a mild hybrid starter generator (MHSG) that includes a rotor having a permanent magnet and an electromagnet, and an engine that is connected to the MHSG for power transmission, the method including:
   determining whether a difference between an excitation current required to drive the MHSG and a target amount of current to be generated by the MHSG is less than a predetermined reference value;
   prohibiting regenerative braking when the difference between the excitation current required to drive the MHSG and the target amount of current to be generated by the MHSG is less than the predetermined reference value;
   wherein the target amount of current to be generated by the MHSG is an estimated amount of current to be generated by the MHSG, and wherein the estimated amount of current to be generated by the MHSG is determined through vehicle traveling information; and
   wherein the estimated amount of current to be generated by the MHSG is determined by estimating a cumulative braking time based on navigation information and a brake pressure signal, and estimating the amount of current to be generated by the MHSG based on the estimated cumulative braking time and a state of charge (SOC) of a vehicle battery.

2. The method of claim 1, wherein the navigation information includes at least one of path information, traffic situation information, and path gradient information.

3. The method of claim 1, wherein the vehicle traveling information includes a driver's driving characteristic information that is previously learned and stored in connection with brake operation.

4. The method of claim 1, wherein the target amount of current to be generated by the MHSG is an amount of current required to charge a 48V battery to a predetermined value and determined based on a current amount of charge in the 48V battery.

* * * * *